June 4, 1968

A. NUTTING 3,386,231

POCKET-TYPE FILTER

Filed Dec. 23, 1966

INVENTOR.
ARTHUR NUTTING

BY Ralph C. Brick
ATTORNEY 3,386,231
POCKET-TYPE FILTER
Arthur Nutting, Louisville, Ky., assignor to American Air Filter Company, Inc., Louisville, Ky., a corporation of Delaware
Filed Dec. 23, 1966, Ser. No. 604,479
8 Claims. (Cl. 55—418)

ABSTRACT OF THE DISCLOSURE

The present invention provides a molded fluid filter formed from a self-supporting filter material to include a plurality of longitudinally extending, side-by-side filter pockets.

Background of the invention

The invention pertains to the fluid filtration art and finds particular utility in the gas separation art wherein particulate materials are separated from a gaseous stream.

Various types of fluid filters of the pocket type are known in the art, the filtering material utilized to form the pockets being of flexible nature. The formation of pockets of such past filter arrangements has been comparatively complex, and the pockets resulting therefrom have been in flat form and have required some types of additional support and forming device either by the fluid stream itself, or by supporting and forming members separate from the material. Furthermore, construction, shipping and maintenance of past pocket-type filter arrangements have proven comparatively expensive, and auxiliary devices have been required to maintain such pockets in proper orientation relative the fluid stream treated in order to avoid interference of the pockets one with another.

Summary of the invention

In accordance with the present invention, a new, useful and unobvious pocket-type fluid filter is provided, which filter can be readily and economically manufactured in large quantities, easily stored and packaged for shipment, and rapidly erected and installed for operational use. Further, the present invention provides a pocket-type filter which permits a maximum of filter material in a given space, which is self-sustaining, and which avoids past problems of pocket-to-pocket interference. In addition, the present invention provides a pocket-type filter and filter media therefor which is readily adaptable to variations in composition and fabrication brought about by specification variations.

Various other features of the present invention will become obvious to one skilled in the art upon reading the disclosure set forth hereinafter.

More particularly, the present invention provides a pocket-type fluid filter comprising: a substantially rigid, self-supporting filtering material molded to provide a unitary filter including a plurality of longitudinally extending, side-by-side filter pockets, the filter pockets each including an open-ended upstream mouth portion, a tube-shaped body portion, and a closed downstream end portion, the mouth portions of the filter pockets having a common integral supporting portion member surrounding and extending transversely therefrom to support the filter pockets in preselected position in a fluid stream to be filtered. In addition, the present invention provides a novel filtering material, as well as a number of structural features in the fabrication of the novel pocket-type fluid filter as described hereinafter.

It is to be understood that various changes can be made in the arrangement, form, and construction of the apparatus disclosed herein without departing from the scope or spirit of the present invention.

Brief description of the drawing

Referring to the drawing which discloses one advantageous embodiment of the present invention.

Description of preferred embodiment

Figure 1:
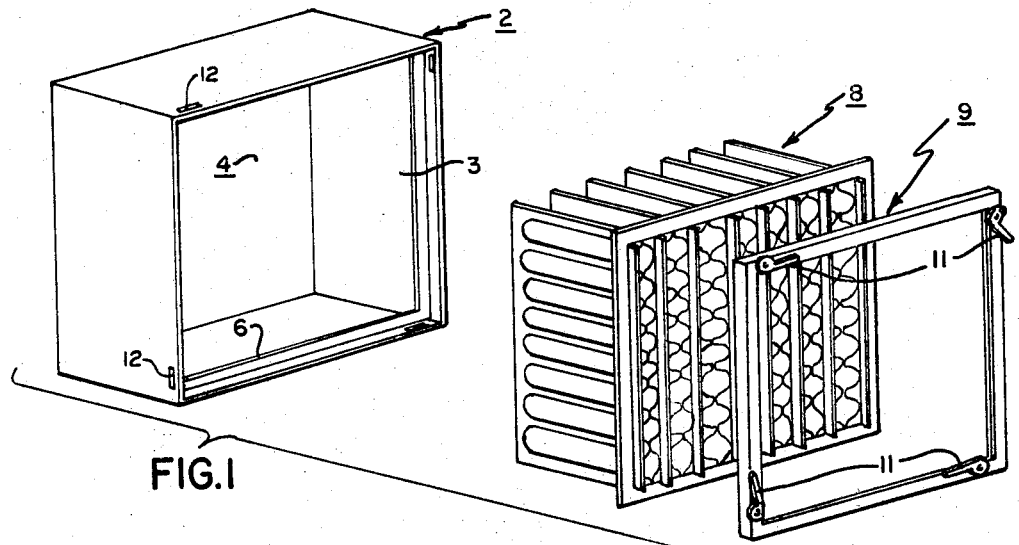
FIGURE 1 is an exploded perspective view disclosing the novel pocket-type fluid filter arrangement in combination with suitable housing structure therefor.

Referring to the drawing, there is disclosed in FIGURE 1 a flow-through rectangular housing 2 having an upstream dirty gas inlet 3 and downstream clean gas outlet 4. Housing 2 is provided with an internal peripheral ledge 6 adjacent upstream inlet 3, the ledge serving to receive the border frame of the novel pocket-type filter assembly broadly referred to by reference numeral 8. A suitable flow-through hold-down frame 9 is provided to nest in housing 2 to hold the border frame of the pocket-type filter 8 in firm relationship against peripheral ledge 6. To fasten hold-down frame 9 to housing 2, a set of cam-type clamps 11 are pivotally mounted on frame 9 adjacent the corners thereof, these fasteners being adapted to engage in slots 12 provided in housing 2 adjacent the corners thereof.

Figure 2:
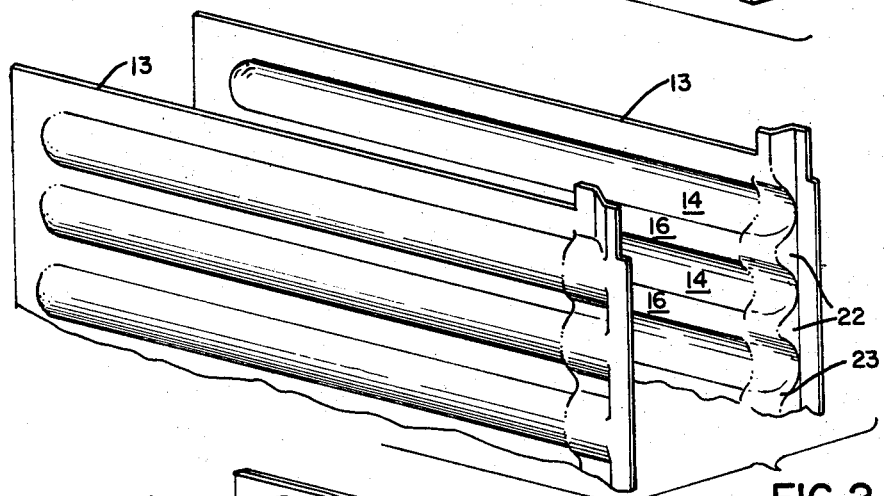
FIGURE 2 is an enlarged exploded perspective view of a pair of substantially identical sheets of filtering material furrowed to provide the filter pockets of the novel pocket-type fluid filter of the present invention.
Figure 3:
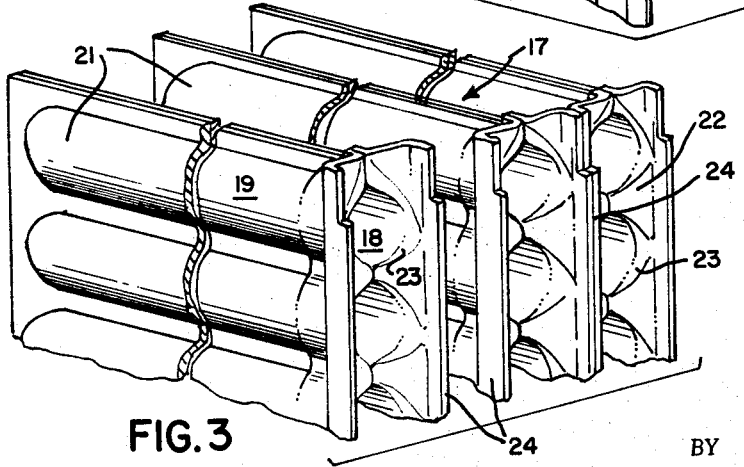
FIGURE 3 is an enlarged perspective view of several pairs of furrowed sheets of filtering material assembled together and joined to provide the novel pocket-type fluid filter arrangement.

Referring to FIGURES 2 and 3 of the drawing, it can be seen that the novel pocket-type fluid filter 8 includes pairs of substantially identical sheets 13 of rigid self-supporting filtering material. The filtering material advantageously can be formed by molding a mixture of a preselected fiber blend and a suitable resin, the fiber blend constituting, by weight, approximately seventy five percent (75%) to approximately eighty five percent (85%) of the mixture, and the resin approximately fifteen percent (15%) to approximately twenty five percent (25%) of such mixture. The fiber blend advantageously is comprised, by weight, of a suitable heat-bondable type synthetic fiber in the range of approximately fifteen percent (15%) to approximately thirty percent (30%), and preferably twenty percent (20%) by weight of such blend. The heat-bondable fiber, in addition to filtering, serves to produce the desirable adhesive properties when a preselected heat is applied to the molded product. It has been found that "Vinyon" fiber manufactured by Celanese Corporation or a suitable thermosetting polyester serves quite satisfactorily as the heat-bondable type synthetic fiber. It further has been found that the heat-bondable type fiber gives best performance when in the diameter range of approximately sixteen (16) to approximately twenty (20) microns, and preferably a diameter size of eighteen (18)

microns. To give the fiber bond loft, in addition to filtering, the fiber blend further includes a non-bonding type synthetic fiber in the range of approximately twenty percent (20%) to approximately forty percent (40%) by weight, and preferably thirty five percent (35%) by weight of such blend. It has been found that nylon, Orlon, or Dacron products manufactured by the Du Pont Company have been quite satisfactory. Advantageously, the diameter size of the non-bonding type synthetic fibers can be in the range of approximately ten (10) microns to approximately sixty (60) microns, and preferably a thirty (30) microns diameter size can be utilized. Finally, to give the fiber blend body, as well as to enhance its filtration efficiencly, a suitable cellulosic fiber is included. This cellulosic fiber can be in the range of approximately twenty percent (20%) to approximately fifty percent (50%) and preferably forty five percent (45%) by weight of the fiber blend. The cellulosic fiber advantageously can be of a diameter size in the range of approximately ten (10) microns to approximately twenty (20) microns, and preferably is twelve (12) microns in diameter size. It has been found that the cellulosic material can be a suitable chemical cotton, wood pulp, or alpha-cellulose material. Once the fibers—which advantageously should not exceed three eights of an inch (⅜″) in length—are properly blended, they are then mixed with a resin, such as a phenol thermoset type resin, to form a slurry. A suitable chemical precipitant, such as alum, is added and the slurried mixture is formed on a vacuum mold to provide identical sheets 13 of rigid, self-supporting filtering material.

Referring to FIGURES 2 and 3 once again, it can be seen that identical filtering material sheets 13 are provided with furrows 14. The sheets 13 are positioned in mirror-image faced relationship with crests 16 of the furrows in substantial abutment to provide a plurality of longitudinally extending side-by-side filter pockets 17. Each pocket 17 includes open-end upstream mouth portion 18, tube-shaped body portion 19, and closed downstream end portion 21. Mouth portions 18 of filter pockets 17 are provided with common integral support portion members 22 which, when the sheets are faced and heat joined, serve to surround the mouths of the pockets extending transversely of the longitudinal axis of such pockets to support the filter pockets in preselected cantilever position in a fluid stream to be filtered. It is to be noted that mouth portions 18 of filter pockets 17 are inwardly tapered as at 23, to decrease flow resistance to the fluid stream to be treated. It further is to be noted that tube-shaped body portions 19 of the filter pockets are of substantially elliptical cross section to provide a maximum of filter material in a given space with a minimum of flow resistance.

As can be seen more clearly in FIGURE 3 of the drawing, the pocket-type filter comprises a plurality of pairs of identical sheets 13 positioned in mirror-image faced relationship with supporting portions 22 of adjacent sheet pairs being joined in faced relationship to provide rows of side-by-side pockets with strengthening ribs as designated by the numeral 24 between the rows. In formation of ribs 24, the edges of portions 22 of adjacent sheets 13 are turned at substantially right angles to the remainder of such portions before being placed in faced relationship to each other and heat sealed. Thus, ribs 24 serve not only as a structural strengthening member, but in addition, provide inlet channels to guide the fluid stream to be treated into mouth portions 18.

It can be seen from the aforedescribed that an improved pocket-type fluid filter is provided which can be readily and economically manufactured in large quantities, easily stored in nesting sheet relationship for packaging and shipment, and readily assembled with a suitable heat-sealing tool. Because of the self-supporting nature of the pockets of the filter and the cantilever mounting, when a fluid stream is applied through filter 8, the downstream ends of the filter pocket rows tend to pivot away from each other so as to decrease the over-all fluid resistance.

The invention claimed is:

1. A pocket-type fluid filter comprising: a substantially rigid self-supporting filtering material molded to provide a unitary filter, the material of which is self supporting throughout, including a plurality of longitudinally extending, side-by-side filter pockets, said filter pockets each including an open-end upstream mouth portion, a tube-shaped body portion, and a closed downstream end portion, said mouth portions of said filter pockets having a common integral supporting portion member surrounding and extending transversely therefrom to support said filter pockets in preselected cantilever extending position to receive a fluid stream to be filtered; said filter material comprising by weight approximately seventy five percent (75%) to eighty five percent (85%) fiber blend and approximately fifteen percent (15%) to approximately twenty five percent (25%) resin; said fiber blend being comprised of a heat bondable type synthetic fiber in the range of approximately fifteen percent (15%) to thirty percent (30%) of such blend, a nonbonding type of synthetic fiber in the range of approximately twenty percent (20%) to approximately forty five percent (45%) of such blend, and a cellulosic fiber in the range of approximately twenty percent (20%) to approximately fifty percent (50%) of such blend.

2. The apparatus of claim 1, said fiber blend being comprised by weight of approximately twenty percent (20%) heat bondable type synthetic fiber, approximately thirty five percent (35%) nonbondable type synthetic fiber, and approximately forty five percent (45%) cellulosic fiber.

3. The apparatus of claim 1, said heat bondable type synthetic fibers of said fiber mixture having diameters in the range of approximately sixteen (16) to approximately twenty (20) microns; said nonbondable type synthetic fibers of said fiber mixture having diameters in the range of approximately ten (10) to approximately sixty (60) microns; and said cellulosic fibers of said fiber mixture having diameters in the range of approximately ten (10) to approximately twenty (20) microns.

4. The apparatus of claim 1, said heat bondable type synthetic fibers of said fiber mixture having diameters of approximately eighteen (18) microns, said nonbondable type synthetic fibers having diameters of approximately thirty (30) microns; and said cellulosic fibers having diameters of approximately twelve (12) microns.

5. A pocket-type fluid filter comprising: a plurality of pairs of identical sheets of rigid, self-supporting filter material, said sheets of each pair being molded in furrow shape and positioned in mirror-image faced relationship with the crests of said furrows in substantial alignment to provide a plurality of longitudinally extending side-by-side filter pockets, the material of which is self supporting throughout, said filter pockets each including an open-end upstream mouth portion, a tube-shaped body portion, and a closed downstream end portion, said mouth portion of said filter pockets having a common integral supporting portion member of the same material as said sheets surrounding and extending transversely therefrom to support said filter pockets in preselected cantiliver extending position to receive a fluid stream to be filtered, said suppporting portion members of adjacent sheet pairs having their edges turned at an angle and the turned edges joined in faced relation to define rows of side-by-side filter pockets with continuous longitudinally extending strengthening rib means between rows defining inlet fluid guide channels communicating with the mouths of the rows of side-by-side filter pockets.

6. The apparatus of claim 5, said edges being turned at substantially right angles and joined in faced relationship.

7. The apparatus of claim 5, said mouth portions of said filter pockets being inwardly tapered to decrease flow resistance to the fluid stream to be treated.

8. The apparatus of claim 5, said tube-shaped body portions of said filter pockets being of substantially elliptical cross section to provide a maximum of filter material in a given space with a minimum of flow resistance.

References Cited
UNITED STATES PATENTS

| | | | |
|---|---|---|---|
| 1,632,895 | 6/1927 | Hagelthorn | 55—341 X |
| 1,743,934 | 1/1930 | Ruemelin | 55—341 X |
| 2,414,833 | 1/1947 | Osborne | 162—188 X |
| 2,464,301 | 3/1949 | Francis | 55—524 X |
| 2,477,000 | 7/1949 | Osborne | 210—508 X |
| 2,676,128 | 4/1954 | Piccard | 55—524 X |
| 2,853,154 | 9/1958 | Rivers | 55—367 X |
| 2,899,351 | 8/1959 | Morse | 162—146 |
| 3,017,239 | 1/1962 | Rodman | 55 |
| 3,039,914 | 6/1962 | Reiman | 210—504 X |
| 3,158,532 | 11/1964 | Pall et al. | 210—504 X |
| 3,220,409 | 11/1965 | Liloia et al. | 55—527 X |
| 3,249,228 | 5/1966 | Arvanitakis | 55 |
| 3,271,237 | 9/1966 | Sommer et al. | 162—146 |
| 3,276,190 | 10/1966 | Babbitt et al. | 55—341 |
| 3,309,848 | 3/1967 | Schwab | 55—341 |

FOREIGN PATENTS

| | | |
|---|---|---|
| 598,660 | 5/1960 | Canada. |
| 1,000,457 | 8/1965 | Great Britain. |

HARRY B. THORNTON, *Primary Examiner.*

D. TALBERT, *Assistant Examiner.*